W. GEE.
Lubricator.
No. 14,236. Patented Feb. 12, 1856.
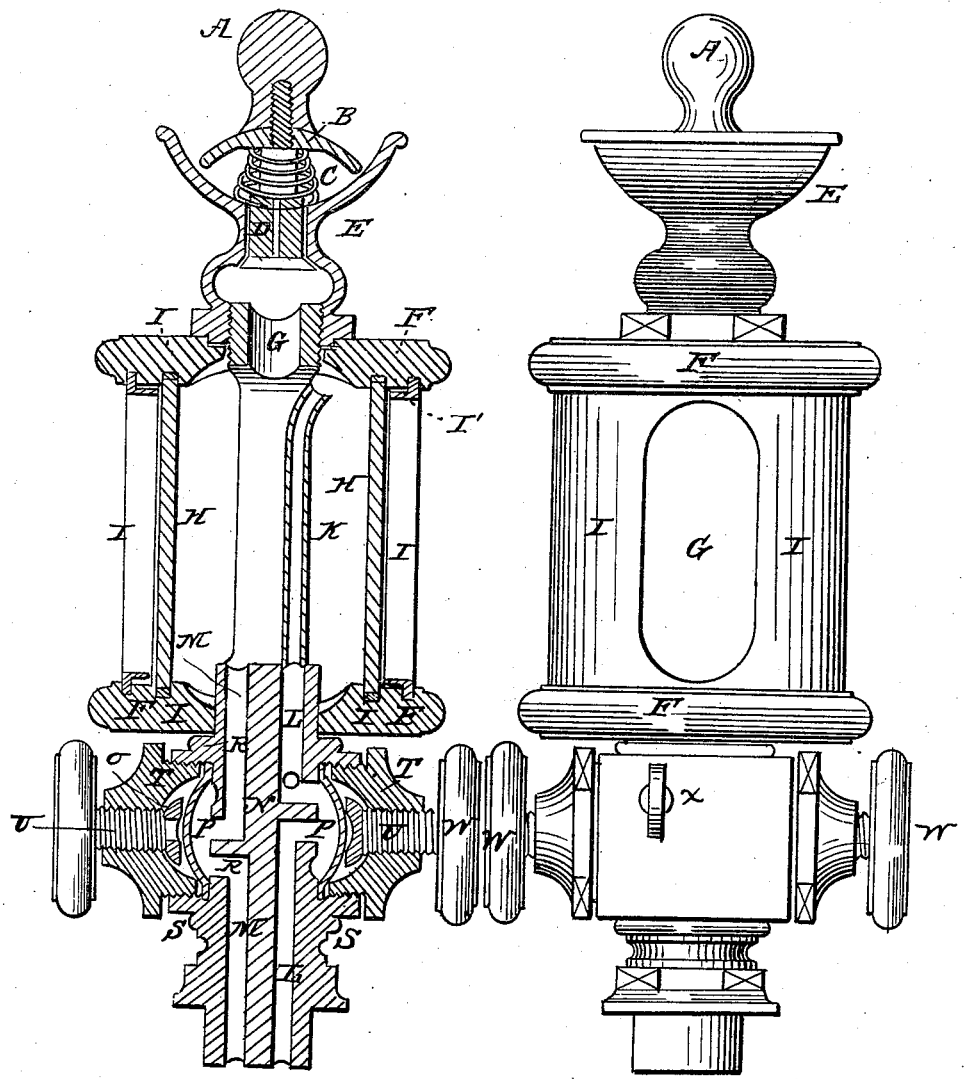
Inventor
William Gee

UNITED STATES PATENT OFFICE.

WILLIAM GEE, OF NEW YORK, N. Y.

LUBRICATOR.

Specification of Letters Patent No. 14,236, dated February 12, 1856.

*To all whom it may concern:*

Be it known that I, WM. GEE, of New York, county of New York, in the State of New York, have invented a new Mode of Lubricating Machinery; and I do hereby declare that the following is a full and exact description thereof, reference being had to the accompanying drawings, and to the letters of reference marked thereon.

To enable others skilled in the art to make and use my invention I will proceed to describe its construction and operation.

A is a knob or handle made of wood or other nonconducting substance.

B is a guide for regulating valve D; C, spiral spring for closing valve D.

E is exterior funnel for pouring oil to supply the lubricator H H which is a glass cylinder.

F F are caps to hold glass lubricator H H and outside case I I in its place. The trap case I I has openings in its sides to allow the glass lubricating cylinder H to be seen, and the oil also to be seen through it.

C is a hollow shaft connected to the double cock N which holds all the parts together by the funnel E. I′ I′ I′ I′ are packings of india rubber or other substance between the glass lubricator H H to prevent any injury to the glass or its breaking as well as to keep it tight, and by its elasticity to allow for the expansion of the glass on becoming heated.

K is a tube made of metal leading to the steam passage L L in double cock N.

M M is the oil passage which rises a little above the bottom cap F and prevents any sediment from the oil stopping up the mouth of M.

O O is two loose washers attached to the screw U U connected to the milled heads, W W. The head U U, and O O are for the purpose of compressing the india rubber diaphrgam P P to the seat R R.

S S are two washers of metal beneath two caps T T to prevent injury to india rubber diaphragm P P.

*x* is a small hole to allow the exit of air while supplying the lubricator with oil.

*Directions for use.*—To pour the oil in, the small cock X should be opened to let out the air, then the knob or handle A must be pressed down so as to open valve D, then the oil may be poured in; when the glass cylinder or lubricator is near full remove the hand and the valve will return to its place, then the cock X should be screwed tight, care should be taken to have the double cocks closed before putting the oil in. To let the oil into the cylinder, or other parts where there is any pressure, the steam valve should be opened first, to let the steam on top of the oil; then open the valve marked oil, which will let the oil into the cylinder; (it will be seen that the two valves are marked steam and oil.) The steam valve should be turned two or three times to let the full pressure of steam on top of the oil, the oil valve can be so regulated that the oil will feed as slow or fast as it is wanted. This lubricator will not waste the oil, as the ordinary kind, nor does it want forcing in every now and then, it will feed itself or can be let down all at once; it has an equilibrium pressure besides the weight of oil.

What I claim is—

1. A glass cylinder H H as above described protected by a trap or other metallic cylinder I I with openings to see the oil, and the tube K as described passing up through the oil which by radiating its heat derived from the hot steam keeps the oil in a liquid state under all temperatures.

2. I also claim the method above described of preventing accidents of the glass breaking by the elasticity of the india rubber above and below the edges of the glass lubricator, as packing I′ I′ I′ I′, as well as the diaphragm of india rubber, as described, the whole in combination as a lubricator, or to supply and regulate the flow of oil, and by sight enable the person attending to know when the oil or lubricating material is exhausted, and by the method herein described.

By the diaphragm P P I do away with the necessity of having ground metallic surfaces, which are always getting out of order. This lubricator will answer for supplying vacuum by opening the cock *x*, the air passing up the tube K above the oil, which forces the oil out and making a vacuum lubricator which I include as part of my claim.

I do not claim as packing india rubber, as that has been used by myself as well as others, nor do I claim cutting away the cylinder to see through it, as that has been used by myself as well as others. But what I do claim is the india rubber diaphragm P, P in combination with double cocks N and cylinder H H, and tube K and valve D, handle A, guide B B, with other parts in combination and operation as set forth in the specification.

WILLIAM GEE.

Witnesses:
EDMUND I. PORTER,
W. D. PORTER.